United States Patent
Ramgattie

(10) Patent No.: US 8,935,844 B2
(45) Date of Patent: Jan. 20, 2015

(54) DEVICE FOR DETERRING UNWANTED REMOVAL OF CABLE FROM CONDUIT

(76) Inventor: Edwin Ramgattie, Hollywood, FL (US)

(*) Notice: Subject to any disclaimer, the term of this patent is extended or adjusted under 35 U.S.C. 154(b) by 649 days.

(21) Appl. No.: 13/010,950

(22) Filed: Jan. 21, 2011

(65) Prior Publication Data
US 2011/0314657 A1 Dec. 29, 2011

Related U.S. Application Data

(60) Provisional application No. 61/359,804, filed on Jun. 29, 2010.

(51) Int. Cl.
*H02G 9/02* (2006.01)

(52) U.S. Cl.
CPC .............. *H02G 9/02* (2013.01); *H02G 2200/10* (2013.01)
USPC ........... 29/527.2; 174/64; 174/72 C; 174/135; 174/152 G; 174/153 G; 29/458; 29/527.1; 29/525.01; 29/469

(58) Field of Classification Search
CPC .............. H02G 9/06; H02G 9/02; H02G 3/26; H02G 3/283; H02G 3/383; F16L 3/12; F16L 7/00
USPC .............. 29/525.01, 525.02, 458, 469, 527.1, 29/527.2; 174/64, 135, 481, 68.3, 68.1, 174/72 A, 72 R, 72 C, 88 R, 152 G, 153 G, 174/77 R, 99 R, 84 R
See application file for complete search history.

(56) References Cited

U.S. PATENT DOCUMENTS

| | | | | |
|---|---|---|---|---|
| 1,337,080 A | * | 4/1920 | Krone | 336/150 |
| 1,706,805 A | | 3/1929 | Moffitt | |
| 2,024,862 A | | 12/1935 | Hooley | |
| 2,440,012 A | * | 4/1948 | Haver | 24/30.5 R |
| 2,963,536 A | * | 12/1960 | Kokalas | 174/77 R |
| 3,380,318 A | * | 4/1968 | Henning | 74/502.4 |
| 4,267,401 A | * | 5/1981 | Wilkinson | 174/77 R |

(Continued)

FOREIGN PATENT DOCUMENTS

| | | | | |
|---|---|---|---|---|
| EP | 1179744 A1 | * | 2/2002 | G02B 6/38 |
| FR | 2781714 A1 | * | 2/2000 | B29C 45/14 |

(Continued)

OTHER PUBLICATIONS

English machine translation of EP 1179744.*

*Primary Examiner* — Essama Omgba
(74) *Attorney, Agent, or Firm* — Mayback & Hoffman, P.A.; Gregory L. Mayback; Thomas Bethea

(57) ABSTRACT

A system for securing at least one cable in a conduit having first and second ends, the at least one cable being housed in the conduit and extending therethrough. The system includes a first inhibiting device disposed at the conduit proximate the first end and a second inhibiting device disposed at the conduit proximate the second end. Each of the inhibiting devices includes a stopper having a proximal end, a distal end, and a passageway formed therethrough for receiving the at least one cable. First and second thickening devices are respectively disposed adjacent each stopper. Each thickening device is operable to secure to the at least one cable. The first and second thickening devices cooperate with a respective one of the stoppers to deter removal of the at least one cable from the conduit when the thickening devices are secured to the at least one cable.

20 Claims, 7 Drawing Sheets

(56) References Cited

U.S. PATENT DOCUMENTS

| | | | |
|---|---|---|---|
| 4,719,316 A * | 1/1988 | Hoffman et al. | 174/88 R |
| 4,990,721 A * | 2/1991 | Sheehan | 174/660 |
| 5,131,650 A * | 7/1992 | Hall | 482/126 |
| 5,222,776 A * | 6/1993 | Georgopoulos et al. | 292/323 |
| 5,647,620 A * | 7/1997 | Kuenzel | 292/317 |
| 5,912,431 A * | 6/1999 | Sheehan | 174/653 |
| 6,145,597 A | 11/2000 | Koblynski | |
| 6,237,620 B1 | 5/2001 | Ferguson | |
| 6,303,857 B1 * | 10/2001 | Ginsburg | 174/45 R |
| 6,306,328 B1 * | 10/2001 | Baffert et al. | 264/242 |
| 6,422,763 B1 * | 7/2002 | Halbach et al. | 385/77 |
| 6,682,355 B1 * | 1/2004 | Gretz | 439/98 |
| 6,872,883 B2 * | 3/2005 | Ginsburg | 174/45 R |
| 6,872,886 B2 * | 3/2005 | Kiely | 174/656 |
| 7,075,007 B2 * | 7/2006 | Auray et al. | 174/668 |
| 7,304,251 B1 * | 12/2007 | Gretz | 174/655 |
| 7,358,448 B2 * | 4/2008 | Auray et al. | 174/666 |
| 7,402,752 B1 * | 7/2008 | Kiely | 174/84 R |
| 7,432,452 B2 * | 10/2008 | Gardner | 174/650 |
| 7,582,831 B2 * | 9/2009 | Kiely et al. | 174/84 R |
| 7,645,947 B2 * | 1/2010 | Kiely et al. | 174/666 |
| 7,723,623 B2 * | 5/2010 | Kiely et al. | 174/666 |
| 7,820,922 B2 * | 10/2010 | Auray et al. | 174/650 |
| 7,824,213 B1 * | 11/2010 | Korcz et al. | 439/552 |
| 7,952,034 B2 * | 5/2011 | Kiely et al. | 174/650 |
| 8,119,933 B2 * | 2/2012 | Auray et al. | 174/650 |
| 8,232,474 B2 * | 7/2012 | Yribarren | 174/99 R |
| 8,242,369 B2 * | 8/2012 | Kiely et al. | 174/84 R |
| 8,350,163 B2 * | 1/2013 | Auray et al. | 174/650 |
| 8,621,725 B2 * | 1/2014 | Ortiz et al. | 24/136 L |
| 8,637,767 B2 * | 1/2014 | Diaz-Vallellanes | 174/45 R |
| 8,704,089 B2 * | 4/2014 | Atchley | 174/45 R |
| 8,841,563 B2 * | 9/2014 | O'Neil | 174/549 |
| 2004/0040123 A1 * | 3/2004 | Tillitski | 24/136 L |
| 2007/0020974 A1 | 1/2007 | Carlson | |
| 2008/0248673 A1 * | 10/2008 | Boehnlein et al. | 439/320 |
| 2008/0302568 A1 * | 12/2008 | Kiely et al. | 174/84 R |
| 2009/0301777 A1 * | 12/2009 | Yribarren | 174/99 R |
| 2010/0071954 A1 * | 3/2010 | Kiely et al. | 174/88 R |
| 2010/0301502 A1 * | 12/2010 | Ott et al. | 264/1.25 |
| 2011/0030429 A1 * | 2/2011 | Goldring | 70/58 |
| 2012/0230004 A1 * | 9/2012 | Atchley | 361/825 |
| 2012/0266447 A1 * | 10/2012 | Diaz-Vallellanes | 29/525.11 |
| 2013/0145583 A1 * | 6/2013 | Ortiz et al. | 24/136 L |

FOREIGN PATENT DOCUMENTS

| | | | | |
|---|---|---|---|---|
| GB | 2462430 A | * | 2/2010 | H02G 9/04 |
| GB | 2484005 A | * | 3/2012 | H02G 15/007 |
| GB | 2505921 A | * | 3/2014 | F16L 3/12 |
| JP | 05303018 A | * | 11/1993 | G02B 6/00 |
| WO | WO 02073762 A1 | * | 9/2002 | H02G 1/06 |
| WO | WO 2009019618 A1 | * | 2/2009 | H02G 9/02 |
| WO | WO 2012003017 A1 | * | 1/2012 | H01R 13/648 |

* cited by examiner

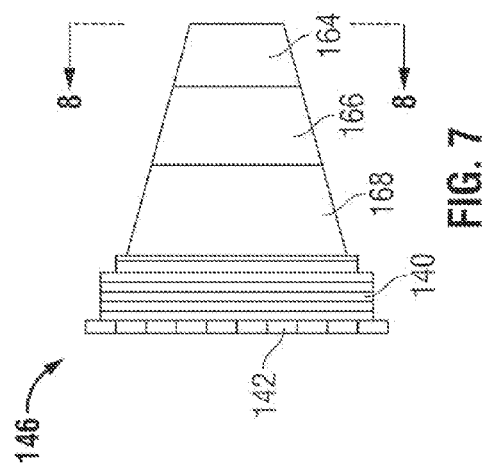
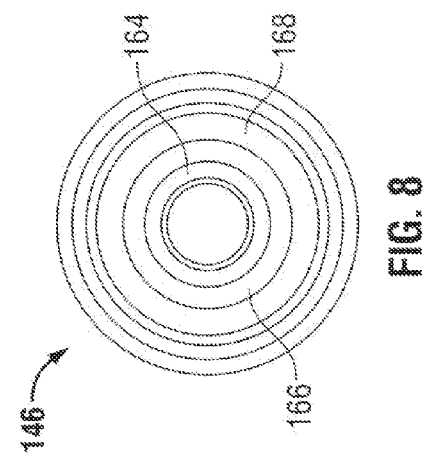
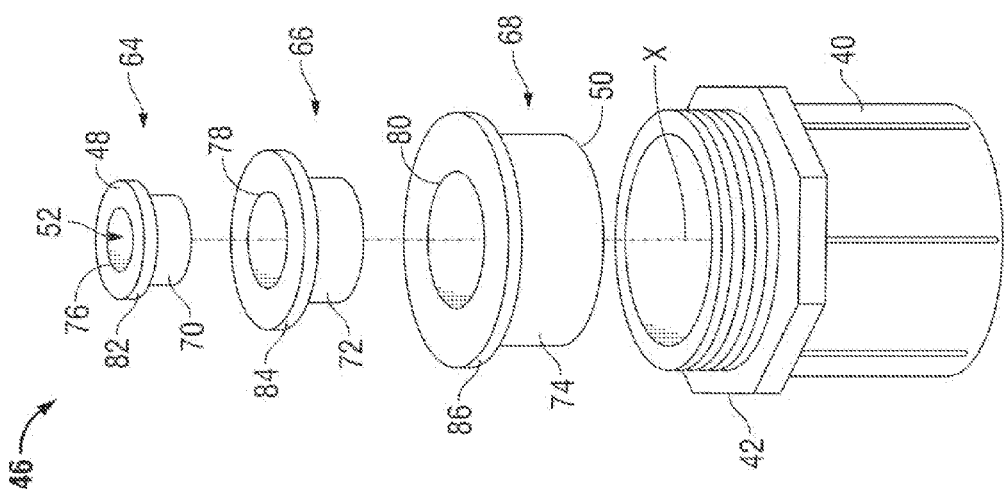

DEVICE FOR DETERRING UNWANTED REMOVAL OF CABLE FROM CONDUIT

CROSS-REFERENCE TO RELATED APPLICATIONS

This application claims the priority, under 35 U.S.C. §119, of copending U.S. Provisional Patent Application Ser. No. 61/359,804, filed Jun. 29, 2010, the entire disclosure of which is hereby incorporated herein by reference in its entirety.

STATEMENT REGARDING FEDERALLY SPONSORED RESEARCH OR DEVELOPMENT

Not Applicable

FIELD OF THE INVENTION

The present invention relates in general to a device, system, and method for securing cable in a conduit system. More particularly, the present invention relates to inhibiting devices placed at opposite ends of a conduit for deterring the removal of cable extending through the conduit.

BACKGROUND OF THE INVENTION

There currently exists a problem with the theft of cables and wires. Thieves may steal long runs of conductive cable and sell the copper conductor from the conductive cable as scrap. Thieves may steal and sell other cables, such as those carrying fiber optic threads, due to the high cost of new fiber optic cable. The theft of these types of cables creates a very costly maintenance problem. The cable itself can be costly to purchase and the labor costs are substantial. Thieves often break system housings and other parts, which must be replaced. Further, the labor to dig up and/or rewire a system is costly. Additionally, system down time costs can become unmanageable.

Thus, there exists a need for a device that deters the theft of cables from a conduit system.

SUMMARY OF THE INVENTION

The invention provides a device, system, and method for securing cable in a conduit system that overcome the hereinafore-mentioned disadvantages of the heretofore-known devices and methods of this general type.

In accordance with the invention, there is provided a system for securing at least one cable in a conduit. The conduit has first and second ends and the at least one cable is housed in the conduit and extends through the first and second ends. The system includes a first inhibiting device disposed at the conduit proximate the first end and a second inhibiting device disposed at the conduit proximate the second end. Each of the inhibiting devices includes a stopper having a proximal end, a distal end, and a passageway formed therethrough for receiving the at least one cable. The system further includes first and second thickening devices respectively disposed adjacent each stopper. Each thickening device is operable to secure to the at least one cable. The first and second thickening devices cooperate with a respective one of the stoppers to deter removal of the at least one cable from the conduit when the thickening devices are secured to the at least one cable.

In accordance with another feature of the invention, each of the inhibiting devices includes a first end and a second end. The stoppers are disposed at the first ends. The conduit includes three tubular channels. A first tubular channel connects the first ends of the inhibiting devices. A second tubular channel extends from the second end of the first inhibiting device and defines the first end of the conduit. A third tubular channel extends from the second end of the second inhibiting device and defines the second end of the conduit.

In accordance with a further feature of the invention, the at least one cable is disposed through the passageway of each stopper. The thickening devices are disposed outside of the passageway and proximally relative to the proximal end of the stopper.

In accordance with an added feature of the invention, each of the inhibiting devices includes a housing which houses the stopper and one of the thickening devices secured to the at least one cable. The distal end of the stopper is attached to the housing.

In accordance with an additional feature of the invention, the passageway of each stopper defines a first inner diameter and each of the thickening devices secured to the at least one cable defines a first outer diameter. The first outer diameter is greater than the first inner diameter.

In accordance with yet another feature of the invention, each stopper includes a plurality of nested cylindrical members. The nested cylindrical members define the passageway through which the at least one cable is received. The plurality of cylindrical members include a first cylindrical member and a second cylindrical member. The first cylindrical member includes a first tubular body portion having a first opening formed therethough and a first proximal lip. The first opening defines the first inner diameter of the passageway. The second cylindrical member includes a second tubular body portion having a second opening formed therethough and a second proximal lip. The second opening is sized to receive the first tubular body portion, wherein the first proximal lip engages the second proximal lip.

In accordance with yet a further feature of the invention, the each stopper includes a hollow conical member that defines the passageway through which the at least one cable is received. The passageway has a tapered diameter, which includes the first inner diameter at the proximal end and extends to a larger second inner diameter at the distal end.

In accordance with yet an added feature of the invention, the at least one cable includes a plurality of cables grouped together. Each cable has first and second thickening devices. The first thickening devices are approximately aligned with one another to form a first group of thickening devices. The second thickening devices are approximately aligned with one another to form a second group of thickening devices.

In accordance with yet an additional feature of the invention, there is provided an expander disposed within each of the first and second groups of thickening devices to increase an outer diameter defined by the first and second groups of thickening devices.

In accordance with again another feature of the invention, each of the first and second thickening devices includes a material applied about an outside surface of the at least one cable to provide a region of the at least one cable with an increased diameter.

In accordance with again a further feature of the invention, the thickening device is comprised of a material including one of rubber and cement.

With the objects of the invention in view, there is also provided an inhibiting device disposed in a conduit at an end thereof for restricting movement of at least one cable extending through the conduit. The at least one cable has a thickening device secured thereto to define a first outer diameter. The inhibiting device includes a housing attached to the conduit and a stopper disposed within the housing. The stopper has a proximal end, a distal end, and a passageway formed therethrough for receiving the at least one cable. The passageway defines a first inner diameter smaller than the first outer diameter defined by the thickening device secured to the at least one cable. This is to restrict movement of the at least one cable in the conduit in a first direction.

In accordance with again an added feature of the invention, the stopper includes a plurality of nested cylindrical members. The cylindrical members define the passageway through which the at least one cable is received. The plurality of cylindrical members include a first cylindrical member and a second cylindrical member. The first cylindrical member includes a first tubular body portion having a first opening formed therethrough and a first proximal lip. The first opening defines the first inner diameter of the passageway. The second cylindrical member includes a second tubular body portion having a second opening formed therethrough and a second proximal lip. The second opening is sized to receive the first tubular body portion, wherein the first proximal lip engages the second proximal lip.

In accordance with again an additional feature of the invention, the stopper includes a hollow conical member that defines the passageway through which the at least one cable is received. The passageway has a tapered diameter, which includes the first inner diameter at the proximal end and extends to a larger second inner diameter at the distal end.

With the objects of the invention in view, there is also provided a method of securing in a conduit at least one cable extending through the conduit. The method includes installing a first inhibiting device at the conduit proximate a first end of the conduit. A first end of the at least one cable is passed through a passageway of the first inhibiting device and a region of the at least one cable proximate the first end thereof is thickened to form a first thickening device at the first inhibiting device. The method further includes installing a second inhibiting device at the conduit proximate a second end of the conduit. A second end of the at least one cable is passed through a passageway of the second inhibiting device and a region of the at least one cable, proximate the second end thereof is thickened to form a second thickening device at the second inhibiting device. The first inhibiting device cooperates with the first thickening device and the second inhibiting device cooperating with the second thickening device to deter removal of the at least one cable from the conduit.

In accordance with still another mode of the invention, each inhibiting device includes a housing attached to the conduit and a stopper disposed therein. The stopper includes a proximal end and a distal end and defines the passageway of the inhibiting device through which the at least one cable is passed. The passageway defines a first inner diameter and the first and second thickening devices each define a first outer diameter, which is greater than the first inner diameter.

In accordance with still a further mode of the invention, the steps of thickening regions of the at least one cable to form thickening devices includes applying a material about an outside surface of the at least one cable. This provides regions of the at least one cable with an increased diameter.

In accordance with still an added mode of the invention, the at least one cable includes a plurality of cables. The thickening steps further include grouping the thickening devices of each of the cables together and applying a material about the group of thickening devices to bond the cables together.

In accordance with still an additional mode of the invention, an expander is inserted within the center of the group of thickening devices before a material is applied about the group of thickening devices. This further increases an outer diameter defined by the group of thickening devices.

In accordance with a concomitant mode of the invention, each housing of the inhibiting devices includes a first end and a second end. The stoppers are disposed within the first ends. The conduit includes three tubular channels. A first tubular channel connects the first ends of the housings. A second tubular channel extends from the second end of the housing of the first inhibiting device and defines the first end of the conduit. A third tubular channel extends from the second end of the housing of the second inhibiting device and defines the second end of the conduit. The method is used in a pull box system, which includes a first pull box and a second pull box. The second and third tubular channels terminate within the first and second pull boxes, respectively. The at least one cable extends beyond the second and third tubular channels within the first and second pull boxes.

Although the invention is illustrated and described herein as embodied in a device, system, and method for securing cable in a conduit system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 6 is an exploded, perspective view of a stopper of the inhibiting device of FIG. 2;

FIG. 7 is a side elevational view of a stopper of an inhibiting device according to another exemplary embodiment of the present invention;

FIG. 8 is a top view of the stopper of FIG. 7 viewed from line 8-8;

DETAILED DESCRIPTION OF THE INVENTION

Figure 1:
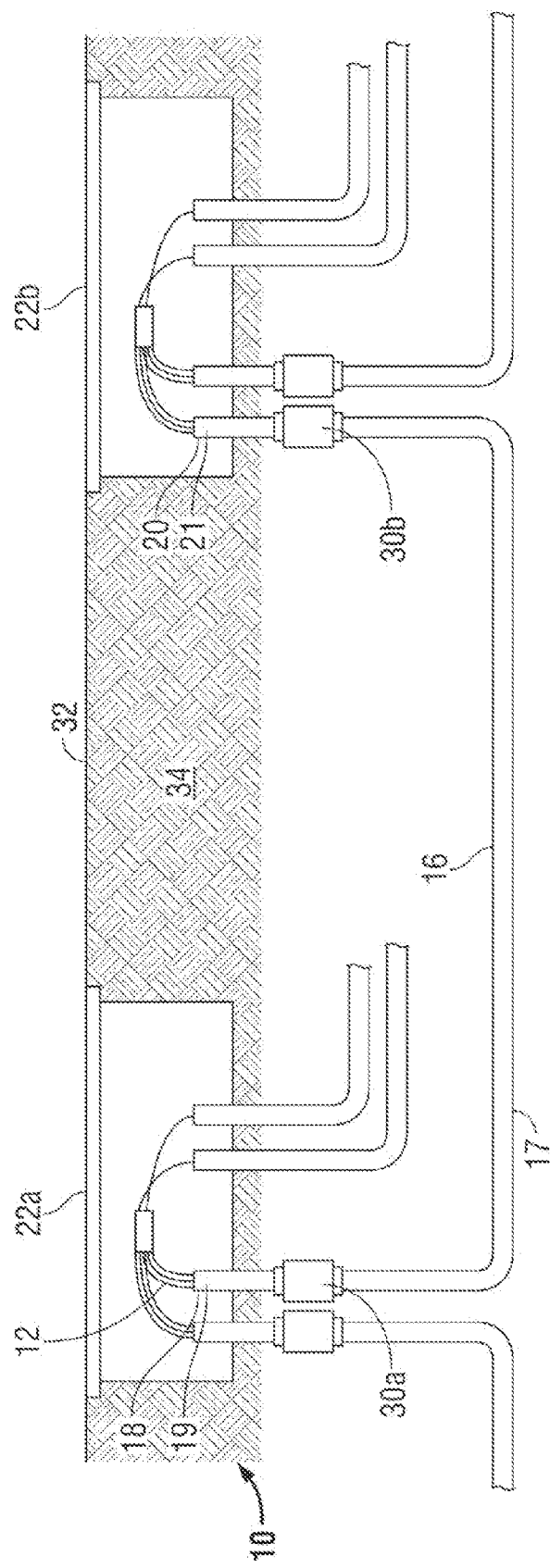
FIG. 1 is a fragmentary, partially sectional, side elevational view of a system according to an exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "proximal," as used herein, is defined as a position closer to the cable accessor, and the term "distal," as used herein, is defined as a position further away from the cable accessor.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIGS. 1 and 2, there is shown a first exemplary embodiment of a system for deterring the theft of cables installed within a conduit according to the present invention. The system 10 illustrated in FIG. 1 is used, for example, as part of a conductive cable pull box system in which cables 12, e.g., conductive wiring, are housed within a conduit 16 having two open ends 18 and 20, each terminating in one of the pull boxes 22a and 22b. As used herein, the terms "cable" and "cables" are defined as one or more than one cable. As illustrated, the cables 12 extend through first and second ends 18, 20 of the conduit 16 and into pull boxes 22a and 22b.

The system 10 includes inhibiting devices 30a and 30b that inhibit the removal of the cables 12 from within the conduit 16. As shown in FIG. 1, the inhibiting devices 30a and 30b are installed, respectively, proximate opposing first and second ends 18, 20 of the conduit 16, underneath pull boxes 22a and 22b. The inhibiting devices 30a and 30b are buried beneath the ground surface 32, for example, within dirt and pea gravel 34, to hide the inhibiting devices 30a and 30b, thus making them less accessible to unauthorized persons.

The inhibiting devices 30a and 30b are pass-through devices, i.e., devices through which the cables 12 pass, and are thus configured to be installed in new or pre-existing conduit systems. For example, inhibiting devices 30a and 30b can be installed on pre-existing pull box systems by cutting a pre-existing conduit and placing the inhibiting devices 30a and 30b within the conduit line. Thus, the conduit 16 through which the cables 12 extend generally includes a connecting tubular channel 17 connecting the inhibiting devices 30a and 30b, an upper tubular channel 19 extending proximally (upwards in FIG. 1) from the inhibiting device 30a below the pull box 22a, and an upper tubular channel 21 extending proximally (upwards in FIG. 1) from the inhibiting device 30b below the pull box 22b. The upper tubular channels 19 and 21 carry the cables 12 to their destination.

Figure 2:
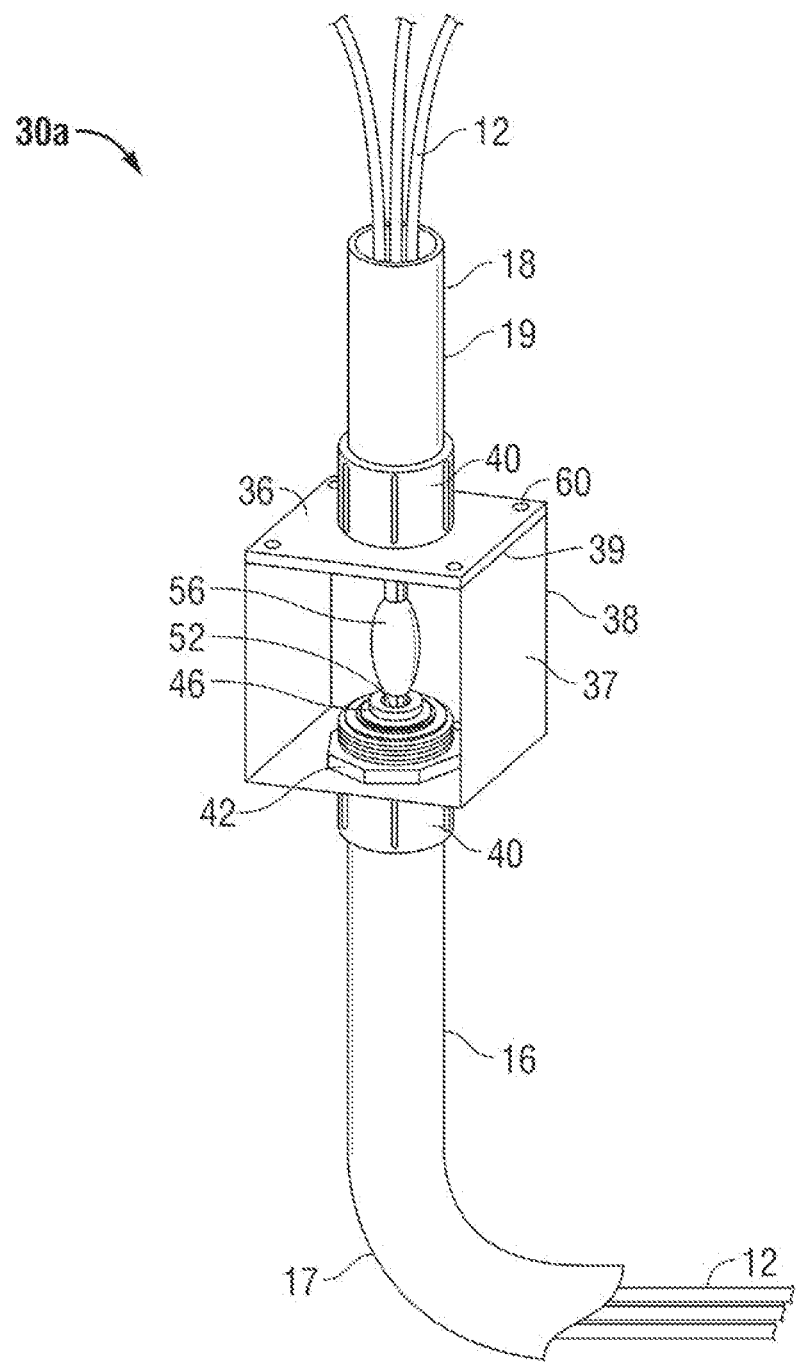
FIG. 2 is a fragmentary, partially cut-away, perspective view of the system of FIG. 1, illustrating the interior of an inhibiting device according to an exemplary embodiment of the present invention.

As best illustrated in FIG. 2, an exemplary inhibiting device 30a includes a housing 38 coupled to the conduit 16 by any suitable measures known or contemplated by one of ordinary skill in the art. In this example, the housing 38 is coupled to the connecting tubular channel 17 at one end via a threaded coupling 40 and lock nut 42, and to the upper tubular channel 19 at an opposing end via another threaded coupling 40 and lock nut (not shown).

Figure 3:
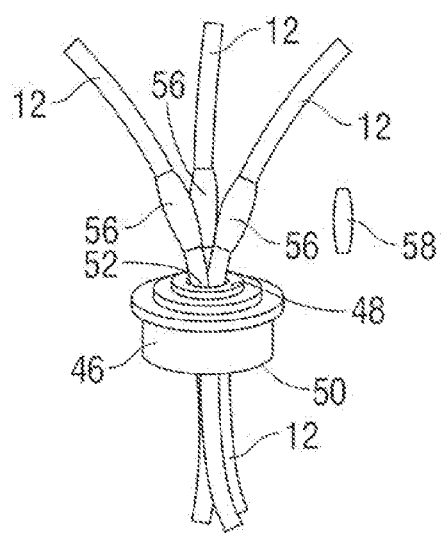
FIGS. 3 to 5 are fragmentary, perspective views of the system of FIG. 1, depicting a method of forming thickened regions on the cables disposed within the inhibiting device of FIG. 2.

The system 10 includes a cable stopper 46 disposed within the housing 38 of each inhibiting device 30a and 30b. As shown in FIG. 3, the stopper 46 includes a proximal end 48, a distal end 50, and a passageway 52 formed therethrough for receiving the cable or cables 12. The distal end 50 is the larger end of the stopper 46 and attaches to the coupling 40. Various exemplary embodiments of a cable stopper 46 according to the present invention are described in subsequent paragraphs with respect to FIGS. 4 to 6.

During installation of the system 10, the housing cover 36 and housing body 37 (see FIG. 2) are removed. It is also within the scope of the present invention for the housing body 37 to have removable side panels to provide access to the cable stopper 46 and cables 12 so that the housing body 37 need not be entirely removed. The cables 12 are pulled from the connecting tubular channel 17 of the conduit 16 and passed through the passageway 52 of the cable stopper 46. The stopper passageway 52 is sized just large enough for the cables 12 to be inserted and passed therethrough. Once the cables 12 have been pulled through the cable stopper 46, the cables 12 are then processed to include a thickened region or thickening device 56 adjacent the smaller end, i.e., the proximal end 48, of the cable stopper 46. In this embodiment, the thickened region 56 is disposed directly above the cable stopper 46 in FIG. 2, i.e., proximally relative to the proximal end 48 of the cable stopper 46, opposite the stopper passageway 52. The smaller diameter passageway 52 of the cable stopper 46 cooperates with the larger diameter of the thickened region 56 to deter removal of the cables 12 from within the conduit 16. As noted above, the term "cable," and thus reference numeral "12," as used herein, may refer to one cable or a plurality of cables. Similarly, the term "thickened region," and thus reference numeral "56," as used herein, may refer to a thickened region of an individual cable or a thickened region of a grouping of cables.

Figure 4:
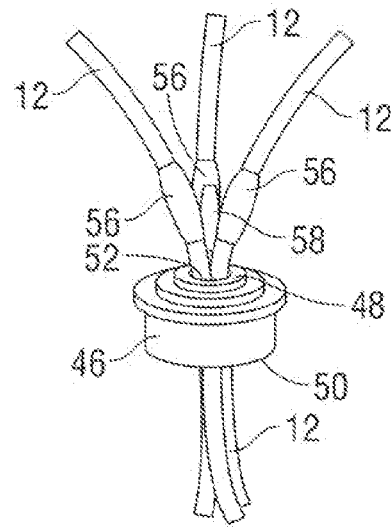
Figure 5:
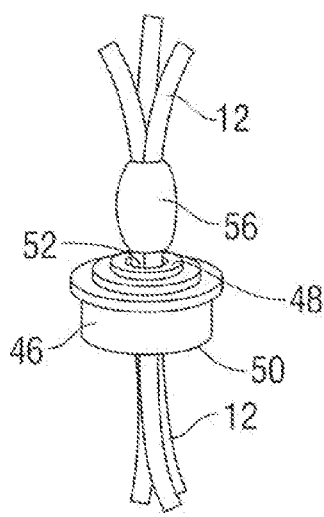

In an exemplary embodiment of the present invention, the thickening of the cables 12 is carried out through a rubberization process, as illustrated in FIGS. 3 to 5. For purposes of this disclosure, the terms "rubberization," and "rubberization process," as used herein, describe a process in which a coating material, preferably a rubber coating material, is applied to the cables 12 and bonds to the cables 12 or cable insulation. In this embodiment, the coating material, or bonding agent, is applied to the cables 12 directly adjacent the proximal end 48 of the cable stopper 46. The coating material hardens and effectively makes a region of the cables 12 wider, and, thus, unable to pass through the stopper passageway 52. Accordingly, the cables 12 cannot be pulled through the conduit 16 in a direction wherein the thickened regions 56 would move toward the cable stopper 46.

The coating material can be rubber, cement, or other material known or contemplated by one of ordinary skill in the art that bonds strongly to the cables 12 and cannot be removed without direct access to the thickened region 56 of the cable 12. Preferably, the coating material is resistant to water, heat, and cold, as cables 12 are often installed in locations without climate control. In another exemplary embodiment, the coating material is comprised of rubber splicing tape, e.g., 3M™ Temflex™ 2155 rubber splicing tape, wound about the cables 12 in a series of layers.

In an exemplary system 10, including a plurality of cables 12, each cable 12 is thickened, or rubberized, first individually (FIGS. 3 to 4) and then the plurality of cables 12 is thickened, or rubberized, together as bundle or group (FIG. 5). In this embodiment, each of the cables 12 is pulled tight through the cable stopper 46 before the thickened regions 56 are formed. The thickened regions 56 are formed, for example, by applying a coating material about an outside surface of each cable 12 just proximal, i.e., directly above in FIG. 3, the proximal end 48 of the cable stopper 46. The coating material is applied to the cables 12 in a way that makes the cables 12 measurably thicker.

In an exemplary embodiment, the thickened regions 56 define an outer diameter of at least around one and one half to around two times the diameter of the cable 12 without the thickened region 56; and the height of the thickened regions 56 is in the range of about 2.5 inches to about 3.5 inches.

When two or more cables 12 are rubberized in a group, all cables 12 in this group will move together, substantially becoming one unit at the thickened region 56, i.e., the rubberization point. No cable 12 will be able to move on its own until after the rubberization process has been reversed. The coating material can be removed from the cables 12 by cutting or debonding, dependent upon the initial rubberization process.

As best shown in FIG. 4, an expander 58 may be inserted within the rubberized cable grouping to further increase the outer diameter of the thickened region 56. In this embodiment, after each cable 12 has been thickened individually, the cables 12 are grouped together, with the thickened regions 56 approximately aligned. The expander 58 is disposed within the center of the cable grouping, adjacent the thickened regions 56 and the coating material is then applied to the group of cables 12, as discussed in further detail below. Prior to insertion of the expander 58 within the cable grouping, it may be beneficial to test the thickened regions 56 of coating material for strength of bond.

In this embodiment, the expander 58 is placed in the center of all of the cables 12, so that the thickened regions 56 are touching the expander 58, as well as touching each other. The thickened regions 56 are pressed firmly together around the expander 58 and the coating material is applied over the top of the individual thickened regions 56 of each cable 12, effectively bonding the cables 12 together as a group. In an exemplary embodiment, the coating material covers each individual thickened region 56 of coating material to provide a composite thickened region 56 of the cable group. Thus, the coating material or bonding agent is applied to fully enclose the thickened regions 56 of the cables 12 and the expander 58. The amount of coating material applied is sufficient to form a thickened region 56 having a larger outer diameter than the inner diameter defined by the stopper passageway 52. The addition of the expander 58 makes the thickened region 56 substantially larger. Accordingly, the cables 12 are unable to pass through the cable stopper 46 in one direction (downward in FIG. 5) because the thickened region 56 will inhibit or entirely prevent motion through the smaller diameter passageway 52. Further, the cables 12 are prevented from moving individually because the rubberization process has bonded them together as one.

In an exemplary embodiment, the expander 58 is comprised of a non-conducting material, e.g. rubber, plastic, or any other suitable non-conducting material known or contemplated by one of ordinary skill in the art. Although shown cylindrical in shape, the expander 58 can have a variety of shapes. In another exemplary embodiment, the expander 58 is shaped to fill the entire space between three cylindrical thickened regions 56. In such an embodiment, the expander 58 has a cross-sectional shape of a gear with three castellations each separated by a groove in which is disposed the installed thickened region 56. The expander 58 is shown as being shorter in length than the length of the thickened regions 56, but this length is only an example. The exemplary expander 58 is fully rubberized using the same method in which the cables 12 are rubberized. That is, the expander 58 is coated with the same coating material as the cables 12. Other configurations understood by one skilled in the art are envisioned as well.

After the cables 12 are processed to form the composite thickened region 56, the housing body 37 is replaced and secured by any suitable measures known in the art, e.g., through lock nut 42. As shown in FIG. 2, the cables 12 are pulled through the housing cover 36 and upper tubular channel 19 of the conduit 16. The thickened region 56 of the cables 12 remains proximate, and in the exemplary embodiment directly adjacent, the cable stopper 46. A housing seal 39 is disposed between the housing body 37 and the housing cover 36. In this embodiment, the housing body 37 and housing cover 36 are coupled together using housing screws 60, thus completing the installation of the inhibiting device 30*a*. All parts described in this exemplary embodiment are fabricated from non-conducting materials, but the housing screws 60 can be an exception to this selection of materials when not exposed to the housing interior.

The way in which the system 10 operates to deter or prevent the removal of cables 12 contained within a conduit 16 can now be described. Typically, when a potential thief attempts to steal the cables 12, the thief opens both pull boxes 22*a* and 22*b*, cuts the cables 12 at both ends, and attempts to pull the cables 12 out of the containing conduit 16. In prior art cable pull box systems, the thief would likely be successful in removing the cables 12. The system 10 of the present invention, however, solves this problem through the use of inhibiting devices 30*a* and 30*b*, which cooperate to prevent the removal of the cables 12 from within the conduit 16.

The inhibiting device 30*a* described above with respect to FIG. 2, by itself, only stops cables 12 from being pulled in one direction, i.e., the thickened region 56 of the cables 12 is prevented from moving in the proximal-to-distal direction, in other words, toward the cable stopper 46 in a direction deeper into the ground. As illustrated in FIG. 1, the inhibiting system 10 includes two or more inhibiting devices 30*a* and 30*b*, including one device disposed at each of the opposing ends 18, 20 of the conduit 16. Each inhibiting device 30*a* and 30*b* on a single conduit 16 is installed at an opposite orientation with respect to the other one of the inhibiting devices 30*a* and 30*b* on the same conduit 16 (i.e., the larger distal ends 50 of both stoppers 46 are oriented toward each other with respect to the cables 12). More specifically, the inhibiting devices 30*a* and 30*b* within the system 10 of FIG. 1 are oriented such that the inhibiting device 30*a* under pull box 22*a* prevents the cables 12 from moving downward into the open end 18 of the conduit 16 under pull box 22*a*; likewise, the inhibiting device 30*b* under pull box 22*b* prevents the cables 12 from moving downward into the open end 20 of the conduit 16 under pull box 22*b*.

In the most common theft situation, with regard to the inhibiting system 10 of the exemplary embodiment of the present invention illustrated in FIG. 1, a thief who breaks into the pull box 22*a* and pulls on the cables 12 in an attempt to steal the cables 12 finds that the cables 12 cannot move from their installed position. As the thief applies a pulling force to the cables 12 within pull box 22*a*, the inhibiting device 30*b* under pull box 22*b* prevents the cables 12 from being moved in the pulling direction. Likewise, if the thief applies a pulling force to the cables 12 within the pull box 22*b*, the inhibiting device 30*a* under pull box 22*a* will prevent the cables 12 from being removed. Thus, within each inhibiting device 30*a* and 30*b*, as a result of an upward pulling force applied to either end of the cables 12, the thickened region 56 at the opposing end of the cables 12 inhibits movement of the cables 12 from their installed positions. As the thickened region 56 is pulled in a downward direction in FIGS. 1 and 2, its larger diameter compared with the diameter of the stopper passageway 52 makes it unable to pass through the cable stopper 46, thereby preventing theft of the cables 12.

This transfer of force allows the system 10 to be robust against the unauthorized removal of cables 12 because the cables 12 in the conduit 16 cannot be removed without prolonged access to both pull boxes 22*a* and 22*b*. One of the inhibiting devices 30*a* and 30*b* must be disabled (by opening the inhibiting device 30*a* or 30*b* and removing the coating material which forms the thickened region 56) before the cables 12 can be removed from the opposite end of the conduit 16. Therefore, in addition to requiring direct access to both pull boxes 22*a*, 22*b*, the potential thief must excavate one of the inhibiting devices 30*a* or 30*b* and disable it before the cables 12 can be removed. Unauthorized persons unaware of the inhibiting devices 30*a* and 30*b*—which are obscured under dirt and gravel 34—be more likely to give up on an attempted theft when the cables 12 are not easily removed.

In a maintenance situation where cables 12 must be removed from within the conduit 16, a maintenance person having knowledge of the inhibiting devices 30*a* and 30*b* need only excavate one of the inhibiting devices 30*a* or 30*b*. If the maintenance person wants to remove cables 12 by pulling them from either pull box 22*a* or 22*b*, the maintenance person simply removes the thickened region 56 of coating material from the cables 12 within the excavated inhibiting device 30*a* or 30*b* and removes the cables 12 by pulling from within the other pull box. For example, to remove the cables 12 by pulling them at pull box 22*b*, the inhibiting device 30*a* under the pull box 22*a* is excavated and the thickened region 56 disposed therein is removed from the cables 12. The maintenance person then accesses the pull box 22*b* and removes the cables 12 by pulling upward (out of the inhibiting device 30*b*). The cables 12 will pass freely through the upper tubular channel 21, the connecting tubular channel 17, and the upper tubular channel 19 of the conduit 16. This does not add significant time or strain to the maintenance person or process because both pull boxes 22*a* and 22*b* are already accessed to disconnect both ends and remove the cables 12 from within the conduit 16.

It is noted that, while the embodiments in this application have been described to protect cables 12 housed within a conduit 16 that terminates within a pull box 22*a*, 22*b*, this is only one example of an application for the system 10 of the present invention. One of ordinary skill in the art would be able to use the disclosed system 10 to secure other types of cables typically housed within a conduit, such as conductive wiring, data cables, phone lines, or other similarly shaped materials that are housed in a conduit. Further, the system 10 is independent of the pull box 22*a*, 22*b* and, therefore, can be installed at any location, with or without a pull box, such as inside of a home, on top of a pole, underground, or above ground.

Referring now to FIG. 6, there is illustrated an exemplary embodiment of the cable stopper 46. In this embodiment, the cable stopper 46 is comprised of a plurality of cylindrical members 64, 66, and 68, which are progressively nested, the largest of which (cylindrical member 68) fits into connecting coupling 40. Each of the cylindrical members 64, 66, 68 includes a respective tubular body portion 70, 72, 74 having different sized openings 76, 78, 80 formed therethrough. Each cylindrical member 64, 66, 68 includes a respective proximal lip 82, 84, 86 along a top edge thereof to prevent it from fully passing through the next largest of the cylindrical members 64, 66, 68. The opening 80 formed through the largest, most distal cylindrical member 68 is the largest in size and, therefore, sized to receive the tubular body portion 72 of the cylindrical member 66, wherein the proximal lips 84 and 86 engage one another. The opening 78 formed through the middle cylindrical member 66 is medium in size and sized to receive the tubular body portion 70 of the cylindrical member 64, wherein the proximal lips 84 and 82 engage one another. The opening 76 formed through the smallest, most proximal cylindrical member 64 is the smallest in size and defines the smallest inner diameter of the passageway 52 of the cable stopper 46.

During installation, cylindrical members 64, 66, 68 are installed, one at a time, starting with the largest down and continuing to the smallest member that still fits over the cables 12. When nested within one another, the plurality of cylindrical members 64, 66, 68 and their respective openings 76, 78, 80 define the passageway 52 through which the cables 12 are received. The passageway 52 defines a central axis X. Any cylindrical members 64, 66, 68 that are too small to encompass the cables 12 will not be used in this installation, but can be saved for any future requirements. While the exemplary embodiment of FIG. 6 shows three cylindrical members 64, 66, 68, the cable stopper 46 may be comprised of more or less cylindrical members 64, 66, 68 as the application demands.

FIGS. 7 and 8 illustrate another exemplary embodiment of a stopper 146 in accordance with the teachings of the present invention, wherein similar parts to the embodiment of FIG. 6 are denoted by like reference numbers but increased by 100. In this embodiment, the reducing cylindrical members 164, 166, 168 are nested similar to the embodiment shown in FIG. 6, but it is the outer edges that are tapered. Tapering the outer edges of cylindrical members 164, 166, 168 makes the assembled composite stopper 146 appear conical.

Further, as an alternative to the two exemplary embodiments described above, the stopper can be a hollow conical shape from which a specific amount of material is removed from the smaller end to create a larger hole. To remove material, a cut is made perpendicular to the direction that the cables travel through the stopper. As more material is removed, the opening will become larger. Therefore, larger cables will require a larger amount of material to be removed.

Figure 9:
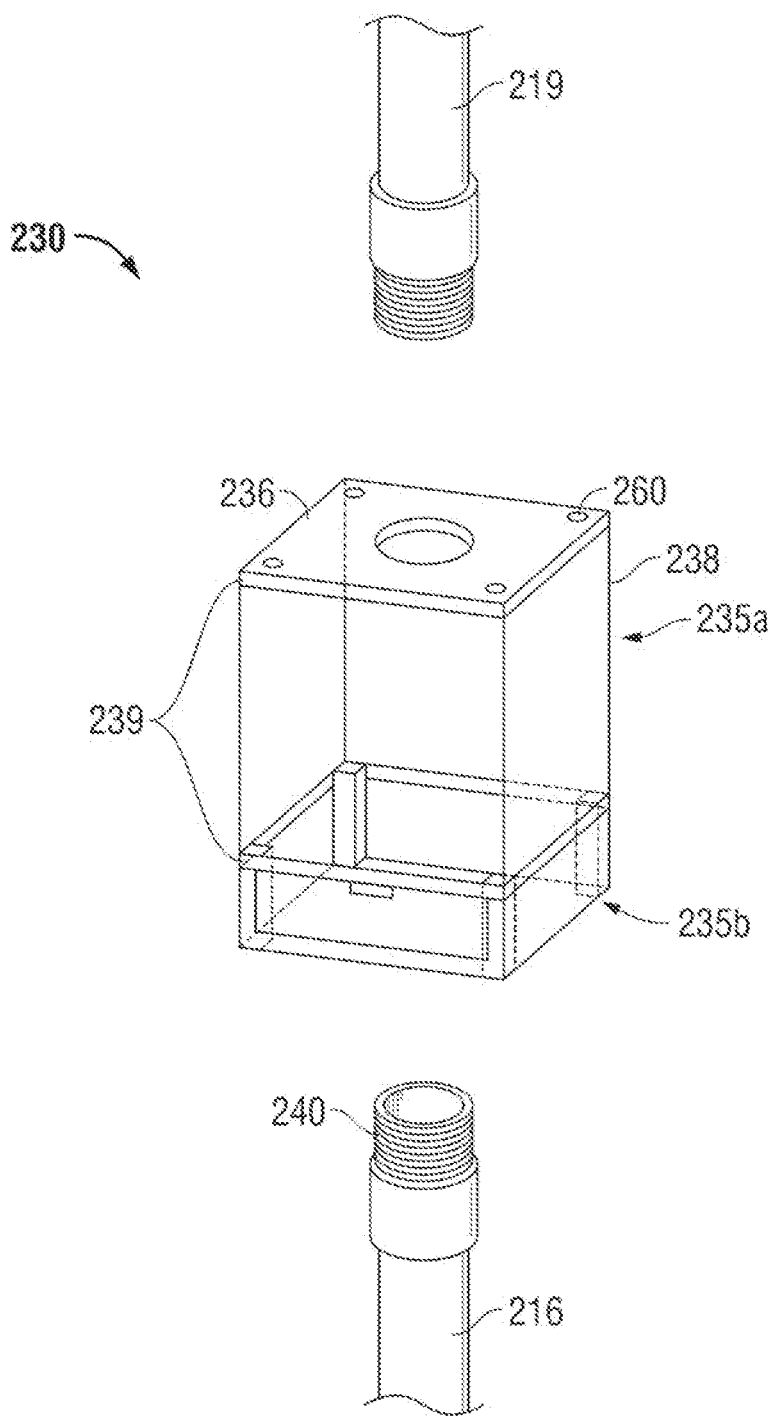
FIG. 9 is a fragmentary, partially transparent, partly exploded, perspective view of a system according to another exemplary embodiment of the present invention, illustrating the interior of an inhibiting device of the system.

Referring to FIG. 9, an alternative exemplary embodiment of an inhibiting device 230 is depicted, wherein similar parts to the embodiment of FIG. 2 are denoted by like reference numbers but increased by 200. In this embodiment, the housing 238 is a three-piece housing 238, which eases installation and maintenance. The housing 238 of FIG. 9 is installed within the inhibiting device 230 in substantially the same way as the housing 38 in FIG. 2. The difference here is that the housing 238 is split into upper and lower sections 235a, 235b to allow unhindered access to the stopper and the thickened region of the cable (not shown) during installation. When section 235a of the housing 238 is removed, there exists more room to accomplish the installation or removal of the thickened region of material coating on the cable.

Figure 12:
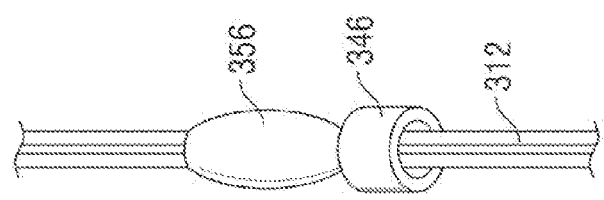
FIG. 12 is a fragmentary, perspective view of the system of FIG. 10, depicting the cables, thickened cable region, and stopper housed within the inhibiting device.
Figure 11:
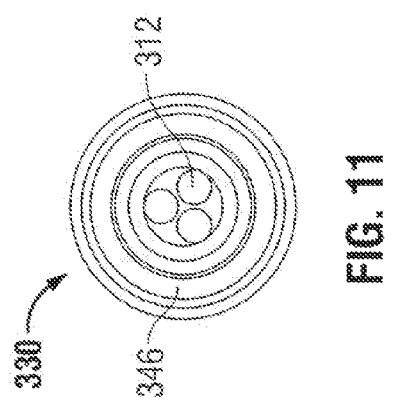
FIG. 11 is a top plan view of the inhibiting device of FIG. 10.
Figure 10:
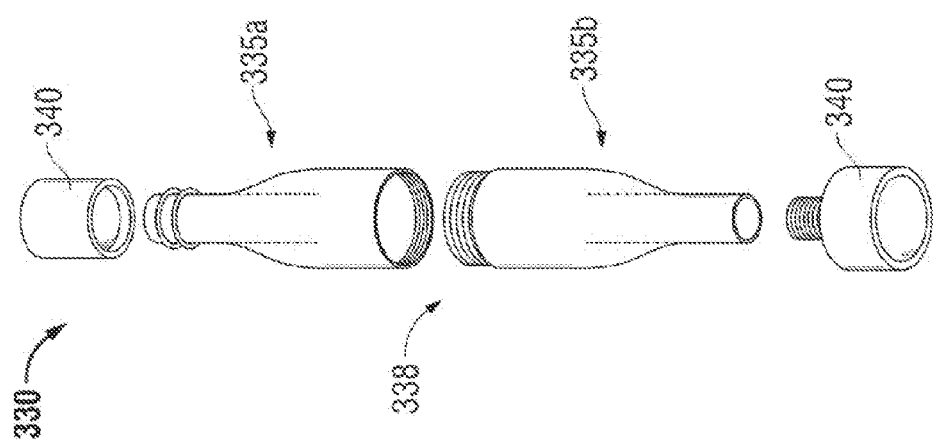
FIG. 10 is a fragmentary, perspective view of an inhibiting device of the system according to yet another exemplary embodiment of the present invention.

FIGS. 10 to 12 depict a further exemplary embodiment of an inhibiting device 330 having a compact design, wherein similar parts to the embodiment of FIG. 2 are denoted by like reference numbers but increased by 300. In this embodiment, the housing 338 includes an upper housing cap 335a and a lower housing section 335b. The upper housing cap 335a encloses the stopper 346 and thickened region 356 of material coating to finalize installation. The upper housing cap 335a eliminates the housing screws, housing seals, and housing cover of the embodiments described above with respect to the housing 38 in FIG. 2. The housing 338 is shaped such that it could be placed within a larger conduit, obscuring the housing 338 from view. As shown in FIG. 10, the upper housing cap 335a is molded into a tapered shape, which provides additional cable 312 protection in both pulling directions. Thus, upon an application of an upward pulling force to the cables 312, the thickened region 356 of coating material applied to the cables 312 is prevented from exiting through the top of housing cap 335a, thus preventing removal of the cables 312 from within the conduit.

Figure 13:
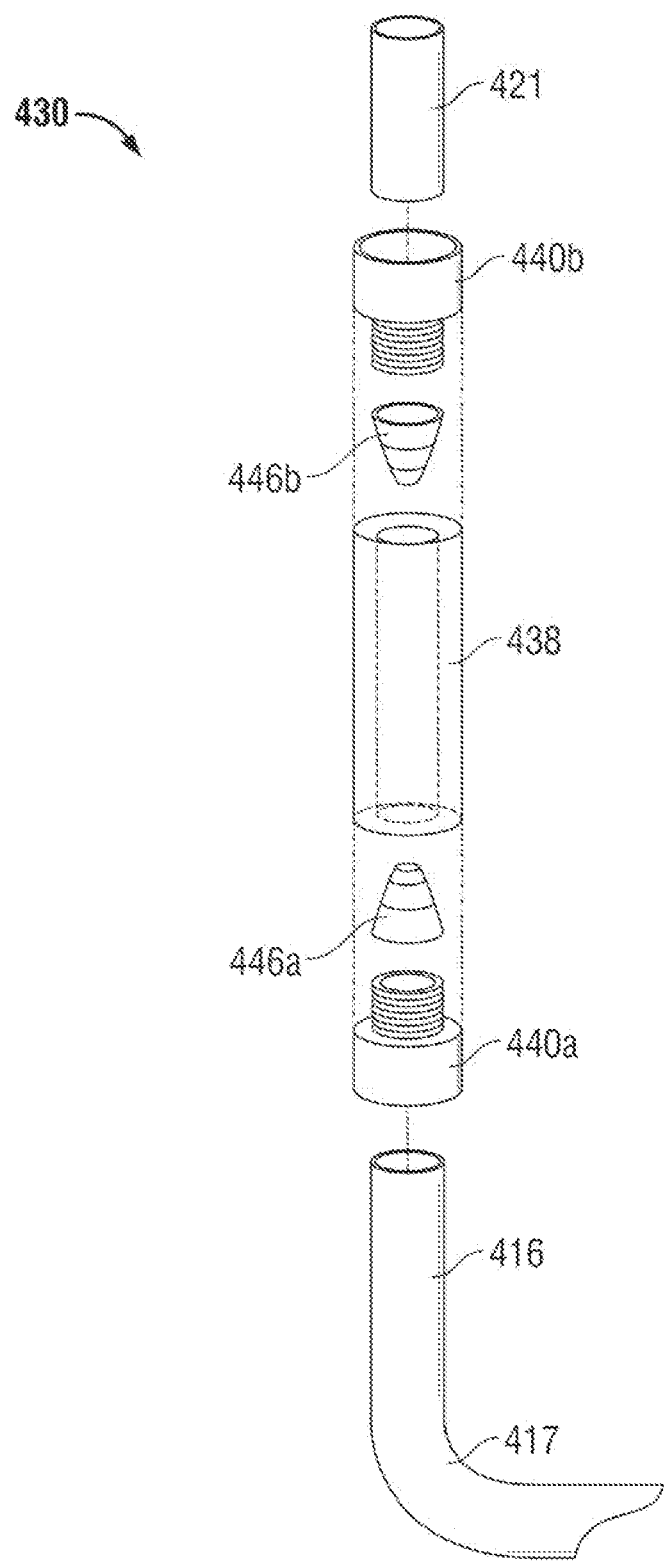
FIG. 13 is a fragmentary, exploded, perspective view of a system according to another exemplary embodiment of the present invention.

FIG. 13 describes an alternative exemplary embodiment of an inhibiting device 430, which enhances the security of the cables (not shown) enclosed therein, wherein similar parts to the embodiment of FIG. 2 are denoted by like reference numbers but increased by 400. The inhibiting device 430 and method for securing cables can be used when security is favored over maintainability of the installed system. It should be noted that, while cables are not shown in the drawing, after installation, cables will pass from the connecting tubular channel 417 through all intermediate parts shown and out of the upper tubular channel 421 of the conduit 416. In this embodiment, cables exit the tubular connecting channel 417 and pass through coupling 440, which is attached to the connecting tubular channel 417 of the conduit 416. The cables are, then, passed through the conical stopper 446a. As shown in FIG. 13, the smallest end of the conical stopper 446a is oriented away from the coupling 440a attached to the channel 417. In this embodiment, the housing 438 is cylindrical in shape and attaches to the coupling 440a. The housing 438 is made of material that is substantially thicker than the conduit 416.

Alternately, the housing 438 may be comprised of two cylinders, one inside the other. After the housing 438 is in place, cables are pulled tight and a liquid or gel bonding material is poured to fill the interior of the housing 438. The bonding material is of a type that hardens over time, permanently encasing the enclosed cables. After the bonding material has hardened slightly, a second stopper 446b is placed over and pushed into the bonding material at the end of the housing 438 opposite the coupling 440a. The smaller end of the stopper 446b is pushed into the bonding material until the larger end of the stopper 446b is flush with the adjacent edge of the housing 438. The, the cables can be inserted through the coupler 440b. This coupler 440b is attached to the housing 438 and the upper tubular channel 421 is attached to the coupler 440b, as shown in FIG. 13. After the bonding material within the interior of the housing 438 fully hardens, the cables will not be removable from the inhibiting device 430 by applying force in either direction.

Another alternate exemplary embodiment of the present invention includes an inhibiting device, similar to that of FIG. 2, but which employs two stoppers, thereby inhibiting motion of the cables in two directions with only a single inhibiting device. In this embodiment, the second stopper is disposed adjacent the thickened region, on the side opposing the stopper. Both stoppers have an end with the smallest opening facing the thickened region. With such a modification, each stopper is able to stop motion of the cables in one direction. Therefore, the cables would not be able to be pulled out from within the conduit. This modified inhibiting device can be installed in the system described in FIG. 1. Such a system would require more work to maintain, since both inhibiting devices must be excavated and disabled before cables can be removed, as opposed to disabling one device in the embodiment of FIG. 2. This alternate embodiment could also be installed singularly at any place within a conduit to inhibit cable movement in both directions. A system employing this modification could enhance security of the cables by installing one inhibiting device in an obscure location, known only to maintenance professionals.

Further, in environments where security is preferred over maintainability, a more permanent coating material, or bonding agent, can be employed. In this case, the inhibiting device housing must be substantially enclosed at both ends so the bonding material cannot escape before hardening. The system is installed as described in the embodiment with two stoppers, with the exception of the bonding material. After the housing is fully assembled, a liquid or gel bonding material is applied to fill the housing. This material then hardens to completely encase the cables after a known curing period. After the bonding material has cured, the cables will not be removable from the system until after the housing has been located and the cables have been cut free.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for securing at least one insulated copper conductor, the system comprising:
    a first pull box;
    a second pull box;
    a conduit having first and second ends, the at least one insulated copper conductor being housed in the conduit and extending through the first and second ends, each end of the conduit terminating in one of the first pull box and the second pull box;
    a first inhibiting device disposed at the conduit proximate the first end;
    a second inhibiting device disposed at the conduit proximate the second end, each of the first and second inhibiting devices including a stopper having a proximal end, a distal end, and a passageway formed therethrough for receiving the at least one insulated copper conductor, each stopper including:
        a plurality of nested cylindrical members defining the passageway through which the at least one insulated copper conductor is received, the plurality of cylindrical members comprising:
            a first cylindrical member including a first tubular body portion having a first opening formed therethrough and a first proximal lip, wherein the first opening defines the first inner diameter of the passageway; and
            a second cylindrical member including a second tubular body portion having a second opening formed therethrough and a second proximal lip, the second opening sized to receive the first tubular body portion, wherein the first proximal lip engages the second proximal lip; and
    first and second thickening devices respectively disposed adjacent each stopper, each operable to be secured to the at least one insulated copper conductor, the first and second thickening devices cooperating with a respective one of the stoppers to deter removal of the at least one insulated copper conductor from the conduit when the first and second thickening devices are secured to the at least one insulated copper conductor, the first thickening device and the second thickening device each comprising a coating material bonded to the at least one insulated copper conductor.

2. The system according to claim 1, wherein each of the inhibiting devices includes a first end and a second end, the stoppers being disposed at the first ends, wherein the conduit includes:
    a first tubular channel connecting the first ends of the inhibiting devices;
    a second tubular channel extending from the second end of the first inhibiting device, the second tubular channel defining the conduit first end; and
    a third tubular channel extending from the second end of the second inhibiting device, the third tubular channel defining the conduit second end.

3. The system according to claim 1, wherein the at least one insulated copper conductor is disposed through the passageway of each stopper and the thickening devices are disposed outside of the passageway and proximally relative to the proximal end of the stopper.

4. The system according to claim 3, wherein each of the inhibiting devices includes a housing which houses the stopper and one of the thickening devices secured to the at least one insulated copper conductor, the distal end of the stopper being attached to the housing.

5. The system according to claim 3, wherein the passageway of each stopper defines a first inner diameter and each of the thickening devices secured to the at least one insulated copper conductor defines a first outer diameter, wherein the first outer diameter is greater than the first inner diameter.

6. The system according to claim 5, wherein each stopper includes a hollow conical member defining the passageway through which the at least one insulated copper conductor is received, the passageway having a tapered diameter including the first inner diameter at the proximal end extending to a larger second inner diameter at the distal end.

7. The system according to claim 1, wherein the at least one insulated copper conductor includes:
    a plurality of insulated copper conductors grouped together, each insulated copper conductor having the first and second thickening devices,
    the first thickening devices being approximately aligned with one another to form a first group of thickening devices, and
    the second thickening devices being approximately aligned with one another to form a second group of thickening devices.

8. The system according to claim 7, further comprising an expander disposed within each of the first and second groups of thickening devices to increase an outer diameter defined by the first and second groups of thickening devices.

9. The system according to claim 1, wherein each of the first and second thickening devices includes the coating material applied about an outside surface of the at least one insulated copper conductor to provide a region of the at least one insulated copper conductor with an increased diameter.

10. The system according to claim 9, wherein the coating material includes one of rubber and cement.

11. An inhibiting device disposed in a conduit at an end thereof for restricting movement of at least one cable extending through the conduit, the at least one cable having a thickening device secured thereto to define a first outer diameter, the inhibiting device comprising:
   a housing attached to the conduit, the housing having:
      a first end attached to an upper tubular channel that extends towards a pull box; and
      a second end attached to the conduit; and
   a stopper disposed within the housing, the stopper having a proximal end, a distal end, and a passageway formed therethrough for receiving the at least one cable, the passageway defining a first inner diameter smaller than the first outer diameter defined by the thickening device secured to the at least one cable to restrict movement of the at least one cable in the conduit in a first direction, the thickening device comprising a coating material bonded to the at least one cable, the stopper including:
      a plurality of nested cylindrical members defining the passageway through which the at least one cable is received, the plurality of cylindrical members comprising:
         a first cylindrical member including a first tubular body portion having a first opening formed therethrough and a first proximal lip, wherein the first opening defines the first inner diameter of the passageway; and
         a second cylindrical member including a second tubular body portion having a second opening formed therethrough and a second proximal lip, the second opening sized to receive the first tubular body portion, wherein the first proximal lip engages the second proximal lip.

12. The inhibiting device according to claim 11, wherein the stopper includes a hollow conical member defining the passageway through which the at least one cable is received, the passageway having a tapered diameter including the first inner diameter at the proximal end extending to a larger second inner diameter at the distal end.

13. The inhibiting device according to claim 11, wherein the cable comprises an insulated copper conductor.

14. The inhibiting device according to claim 11, wherein the cable comprises a fiber optic cable.

15. A method of securing in a conduit at least one insulated copper conductor extending through the conduit, the method comprising:
   installing a first inhibiting device at the conduit proximate a first end of the conduit;
   passing a first end of the at least one insulated copper conductor through a passageway of the first inhibiting device;
   thickening a region of the at least one insulated copper conductor proximate the first end of the at least one insulated copper conductor to form a first thickening device at the first inhibiting device;
   installing a second inhibiting device at the conduit proximate a second end of the conduit;
   passing a second end of the at least one insulated copper conductor through a passageway of the second inhibiting device;
   thickening a region of the at least one insulated copper conductor proximate the second end of the at least one insulated copper conductor to form a second thickening device at the second inhibiting device, the first inhibiting device cooperating with the first thickening device and the second inhibiting device cooperating with the second thickening device to deter removal of the at least one insulated copper conductor from the conduit, the first thickening device and the second thickening device each comprising a coating material bonded to the at least one insulated copper conductor; and
   wherein each inhibiting device comprises:
      a housing attached to the conduit, the housing having:
         a first end attached to an upper tubular channel that extends towards a pull system; and
         a second end attached to the conduit; and
      a stopper disposed within the housing, the stopper including:
         a plurality of nested cylindrical members defining the passageway through which the at least one insulated copper conductor is received, the plurality of cylindrical members comprising:
            a first cylindrical member including a first tubular body portion having a first opening formed therethrough and a first proximal lip, wherein the first opening defines the first inner diameter of the passageway; and
            a second cylindrical member including a second tubular body portion having a second opening formed therethrough and a second proximal lip, the second opening sized to receive the first tubular body portion, wherein the first proximal lip engages the second proximal lip.

16. The method according to claim 15, wherein the stopper includes a proximal end and a distal end and defines the passageway of the inhibiting device through which the at least one insulated copper conductor is passed, wherein the passageway defines a first inner diameter and the first and second thickening devices each define a first outer diameter, the first outer diameter being greater than the first inner diameter.

17. The method according to claim 16, wherein each housing of the inhibiting devices includes a first end and a second end, the stoppers being disposed within the first ends, wherein the conduit includes:
   a first tubular channel connecting the first ends of the housings;
   a second tubular channel extending from the second end of the housing of the first inhibiting device, the second tubular channel defining the conduit first end; and
   a third tubular channel extending from the second end of the housing of the second inhibiting device, the third tubular channel defining the conduit second end,
   wherein the method is used in a pull box system including a first pull box and a second pull box, wherein the second and third tubular channels terminate within the first and second pull boxes, respectively, and wherein the at least one insulated copper conductor extends beyond the second and third tubular channels within the first and second pull boxes.

18. The method according to claim 15, wherein the thickening steps include:

applying the coating material about an outside surface of the at least one insulated copper conductor to provide regions of the at least one insulated copper conductor with an increased diameter.

19. The method according to claim 18, wherein the at least one insulated copper conductor includes a plurality of insulated copper conductors, wherein the thickening steps further include:
   grouping the thickening devices of each of the insulated copper conductors together; and
   applying the coating material about the group of thickening devices to bond the insulated copper conductors together.

20. The method according to claim 19, further comprising, before applying the coating material about the group of thickening devices:
   inserting an expander within a center of the group of thickening devices to further increase an outer diameter defined by the group of thickening devices.

* * * * *